April 5, 1938.  C. A. HAMILTON  2,112,908
CONTINUOUS TUYÈRE
Filed June 15, 1937
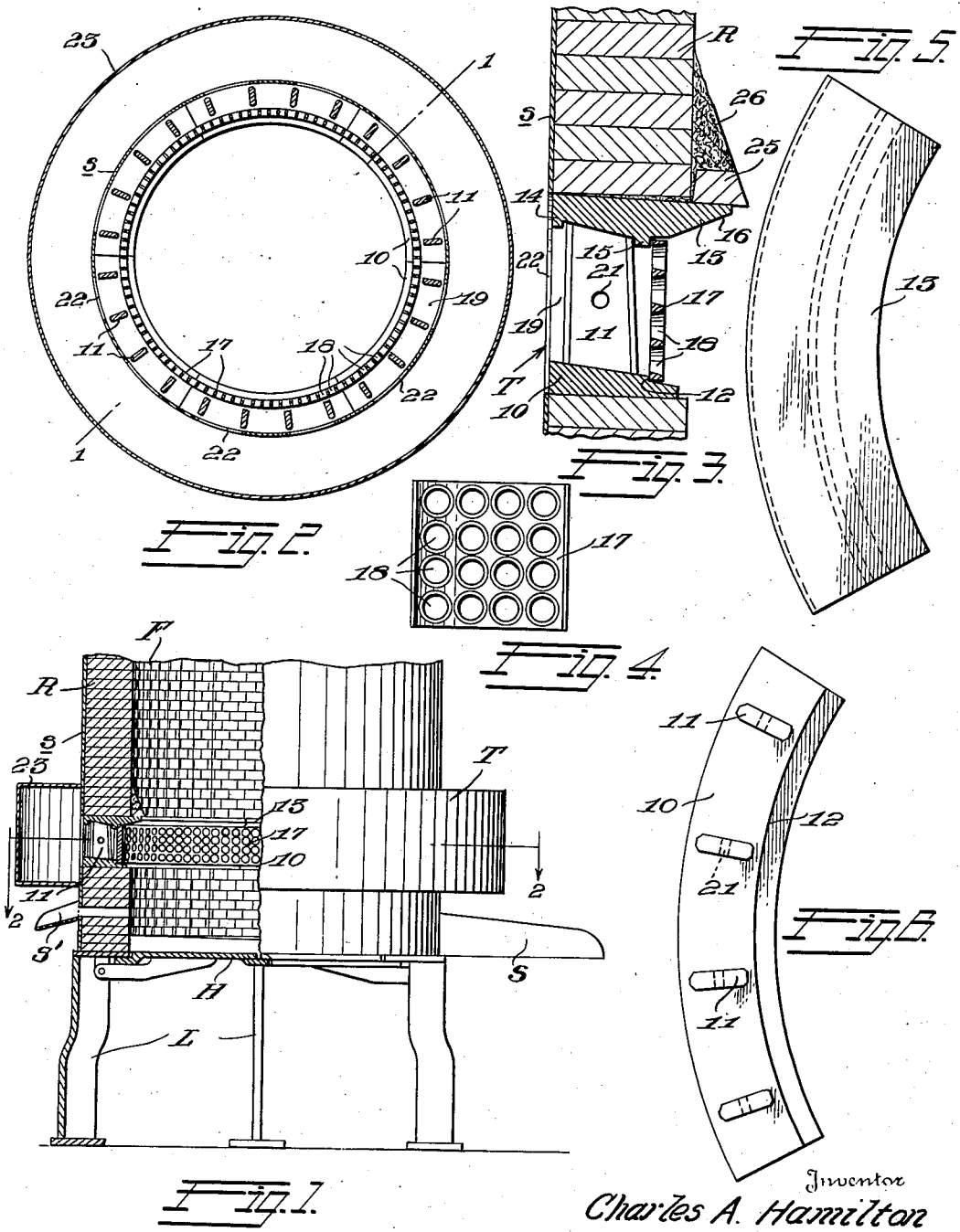
Inventor
Charles A. Hamilton
By George E. Cook.
Attorney Patented Apr. 5, 1938

2,112,908

UNITED STATES PATENT OFFICE 2,112,908

CONTINUOUS TUYÈRE

Charles A. Hamilton, Anniston, Ala.

Application June 15, 1937, Serial No. 148,402

8 Claims. (Cl. 266—30)

This invention relates to tuyère constructions for blast furnaces or cupolas.

More particularly the invention relates to a continuous tuyère construction for incorporation within the wall of a cupola or blast furnace adjacent to and circumferentially of the melting zone for admitting air within the cupola or blast furnace under conditions conducive of maximum combustion efficiency.

It is generally recognized in blast furnace practice that a constant and uniform flow of air at relatively low pressure is essential for proper combustion of the coke in the melting zone whereby the molten metal will normally descend to the hearth, thus avoiding injury to the tuyère structure which projects within the melting zone. These conditions are also recognized as essential in order to effect proper melting of the ore by the use of a minimum amount of fuel.

In tuyère constructions, as heretofore proposed and employed, the air in most instances was admitted at circumferentially spaced points under relatively high pressure, thus resulting in a nonuniform air pressure within the melting zone with the result that cross currents were set up which have been recognized as adverse to maximum combustion efficiency and thus failing to meet the above-noted requirements of tuyère constructions.

A primary object of the present invention is the provision of a tuyère construction which substantially fulfils the above-noted requirements.

A further object of the invention is the provision of a tuyère construction by the use of which the proper amount of evenly distributed air is admitted to the melting zone, whereby no cross currents are set up and thus maximum combustion efficiency is obtained.

A still further object of the invention is the provision of a tuyère construction comprising abutting plates circumferentially surrounding the melting zone in a furnace, the plates being provided with a multiplicity of closely spaced holes for uniformly admitting air circumferentially surrounding the plates to the melting zone, whereby maximum combustion efficiency is obtained and whereby the circulation of air around the plates and through the holes therein prevents over-heating of the plates and clogging of the holes.

A still further object of the invention is the provision of a tuyère construction comprising an air chamber circumferentially surrounding the melting zone in a furnace and a circumferential wall between the air chamber and melting zone, the wall being provided with a multiplicity of closely spaced inwardly diverging holes, whereby air is uniformly admitted under relatively low pressure to the melting zone, for maximum combustion efficiency within the melting zone.

A still further object of the invention is the provision of a tuyère construction which, while satisfactorily meeting the maximum requirements of structures of this general character, is capable of being manufactured, sold, and installed at relatively low cost.

With the above objects in view, as well as others that will become obvious during the course of the following disclosure, reference will be made to the accompanying drawing, forming part of same, and wherein:—

Fig. 1 is a view partially in elevation and partially in vertical section of a portion of a cupola or blast furnace disclosing the application of my invention in a preferred embodiment thereof;

Fig. 2 is a horizontal sectional view in a plane substantially as represented by the line 2—2 in Fig. 1;

Fig. 3 is a vertical sectional view of the improved tuyère construction and a portion of a furnace on an enlarged scale;

Fig. 4 is an inside view of one of the apertured tuyère plates;

Fig. 5 is a top plan view of one of the upper supporting plates; and

Fig. 6 is a top plan view of one of the bottom supporting plates.

Referring to the drawing by reference characters, and wherein like characters designate like parts, F designates a portion of a cupola or furnace which may be of any well-known construction and which essentially comprises supporting legs L, a hearth H, and the usual refractory lining R. The furnace comprises also the usual molten metal discharge spouts S and S'.

The tuyère construction in accordance with the present invention is disposed within the furnace lining R in vertically spaced relation to the hearth H, as is clearly indicated in Fig. 1, and is represented in its entirety by the reference character T.

The improved tuyère construction T comprises a plurality of bottom plates, which, as indicated in Fig. 2, are disposed in end abutting relation and jointly provide a ring circumferentially of the furnace F. The plates 10 are laid upon one of the courses of brick of the lining R, as is indicated in Figs. 1 and 3, the plates being substantially of the same width as the lining brick.

The upper faces of the plates 10 have an inward taper and each is provided with a plurality of supporting risers 11, which preferably are cast with the plates. However, they may be rigidly connected in other ways, if desired.

The plates 10 adjacent the inner edges thereof are reduced in thickness, providing shoulders 12, for a purpose hereinafter described.

Supported upon the upper ends of the risers 11 are a plurality of sector-shaped plates 13, which are provided on their lower faces with spaced ribs 14 and 15 defining a channel for receiving the upper ends of the risers 11 and preventing lateral movement of the plates 13 relatively thereto. The lower faces of plates 13 between the ribs 14 and 15 are downwardly and inwardly tapered substantially in parallelism with the tapered upper faces of the plates 10.

The plates 13 have their lower faces substantially horizontal adjacent the inner edges of ribs 15, for a purpose later described, and then taper upwardly and inwardly, providing extensions 16 projecting within the inner surface of the furnace lining, as is clearly indicated in Fig. 3.

Vertically disposed between the plates 10 and 13 are a plurality of apertured plates 17, which are arranged in end abutting relation and providing a ring circumferentially of the furnace F.

The plates 17 have their lower and top edges seated on the plates 10 and 13 and in engagement with the shoulder 12 and ribs 15, respectively, the plates 17 being rigidly secured in position by suitable adhesive means.

The plates 17 are each provided with a plurality of closely spaced apertures, holes, or nozzles 18, which, as is clearly illustrated in Figs. 3 and 4, have an outward taper toward the inner faces of the plates, for a purpose later described.

The plates 10, 13, and 17 together with the outer shell s of the furnace provide a circumferential air chamber 19, and while the risers 11 are disposed within this chamber, same are of substantially less width than the chamber, as is indicated in Fig. 3, and each of the risers may be provided with one or more apertures 21, whereby the circulation of air in the chamber will not be substantially impaired. Furthermore, it is to be noted that the risers 11 are disposed radially opposite the centers of adjacent holes 18, whereby better circulation of air is obtained.

The furnace shell s is provided with a relatively large hole 22 between the risers 11 of each alternative pair thereof for unimpaired admission of air from a bustle pipe 23 circumferentially surrounding the lining and to which air is admitted by any suitable or well-known means.

The projections 16 are preferably covered by a course of lining brick 25, whose inner sides taper upwardly and outwardly, and supported upon this course of brick is a suitable heat-resisting material 26, whose inner surface slopes upwardly and outwardly in continuity with that of bricks 25, whereby forming an inwardly and downwardly tapering surface for directing the molten metal away from injurious contact with the plates 17.

In operation of the construction above described, a blast of air, which may be hot air, warm air, or normal temperature air, is admitted practically unobstructed from the bustle pipe 23, through the large openings 22 in the shell s and into the chamber 19, where the air has a free circulation around the plates 17, and due to the large number of closely spaced and inwardly diverging holes 18 in the plates 17, the air enters the melting zone in the furnace with an even flow and lack of undesirable cross currents.

Furthermore, by tapering the holes 18 as disclosed, the air enters the melting zone at relatively low pressure and velocity, which is highly desirable for maximum efficiency in combustion.

By means of the inwardly and downwardly sloped faces of plates 10 and 13, the air from the bustle pipe 23 is directed more efficiently to the melting zone within the cupola or furnace.

Due to the circulation of air circumferentially around the plates 17 within chamber 19, as well as the passage of air through the large number of holes 18, the plates 17 are prevented from becoming over-heated and clogging of the holes 18 is substantially avoided.

By the provision of the bridge defined by the projection 16, molten metal is directed away from contact with the plates, due to which and the air cooling, as above described, the life of the plates is greatly prolonged.

The improved tuyère construction in accordance with this invention provides a material saving in coke consumption because of greater combustion efficiency. By the introduction of measured air at a relatively low pressure, less free air comes in contact with the ore and thus prevents oxidation as well as a further saving of fuel, which would be necessary to heat surplus air.

These conditions insure a faster melting of metals, a lower sulphur content iron, the use of higher grade limestone to absorb more sulphur, and a consequent saving in labor, electrical power, and due to cleaner melting, a saving of refractory cupola or furnace lining.

The construction as disclosed admits of expeditious installation or repair in that any or all of the plates may be easily installed or replaced without the necessity of removing the lining around the tuyère area or the melting zone.

While I have disclosed but a single specific embodiment of my invention, same is to be considered as illustrative only, and not restrictive, the scope of the invention being defined in the subjoined claims.

What I claim and desire to secure by U. S. Letters Patent is:—

1. In combination with a furnace stack comprising a shell and a refractory lining; horizontally disposed and vertically spaced rings in said lining, a vertically disposed ring between said horizontal rings adjacent the inner edges thereof, said rings in combination with said shell defining a continuous circumferential air chamber, said shell provided with openings, a bustle pipe surrounding said shell for admitting air to said chamber through said openings, and a multiplicity of closely and uniformly spaced apertures in said vertically disposed ring for directing air uniformly from said chamber to the melting zone in said stack.

2. The structure defined in claim 1, wherein said rings each comprise a series of abutting segmental plates.

3. The structure defined in claim 1, wherein said horizontally disposed rings are maintained in vertically spaced relation by risers of less width than said air chamber and each provided with an opening between the upper and lower ends thereof.

4. In combination with a furnace stack comprising a shell and a refractory lining; horizontally disposed and vertically spaced rings in said lining, circumferentially spaced risers between said rings, relatively large openings in said shell between certain of said risers, a bustle pipe surrounding said shell in communication with said openings, and a vertically disposed ring between said horizontally disposed rings and in radially inward spaced relation to said risers, said vertically disposed ring provided with a plurality of closely and uniformly spaced apertures certain of which have their centers in radial alignment with said risers.

5. A tuyére for cupolas or blast furnaces comprising a continuous circumferential air chamber defined by top, bottom, and inner and outer side walls, the outer side wall having relatively large circumferentially spaced openings for admitting air to the chamber, and the inner side wall having a multiplicity of closely and uniformly spaced relatively small openings for discharging air from the chamber at substantially equal pressure at all points to the area within the inner side wall, the top and bottom walls being maintained in vertically spaced relation by vertically disposed risers between and in laterally spaced relation to said side walls and within said chamber.

6. A tuyére for cupolas or blast furnaces comprising a continuous circumferential air chamber defined by top, bottom and inner and outer side walls, the outer side wall having relatively large circumferentially spaced openings for admitting air to the chamber, and the inner side wall having a multiplicity of closely and uniformly spaced relatively small openings for discharging air from the chamber at substantially equal pressure at all points to the area within the inner side wall, the top and bottom walls each comprising a series of segmental plates, the plates of the bottom wall each being provided with unitary risers for engaging and supporting the plates of the top wall between said side walls.

7. In combination with a furnace stack having a shell and a refractory lining; a tuyére comprising a continuous circumferential air chamber within said lining and adjacent the melting zone in said furnace, a bustle pipe circumferentially surrounding said shell for admitting air through openings in said shell to said chamber, and a multiplicity of closely and uniformly spaced apertures in the inner side wall of said chamber for directing air evenly to said melting zone, the upper wall of said chamber projecting within the inner surface of said lining, providing a bridge for protecting the apertured side wall from molten metal and slag.

8. In combination with a furnace stack having a shell and a refractory lining; a tuyére comprising a continuous circumferential air chamber within said lining and adjacent the melting zone in said furnace, a bustle pipe circumferentially surrounding said shell for admitting air through openings in said shell to said air chamber, and a multiplicity of closely and uniformly spaced apertures in the inner side wall of said chamber for directing air evenly to said melting zone, the top and bottom walls of said air chamber each comprising a series of segmental plates maintained in vertically spaced relation by vertically disposed and horizontally apertured risers between said plates.

CHARLES A. HAMILTON.